(12) United States Patent
Hannan et al.

(10) Patent No.: US 11,685,080 B2
(45) Date of Patent: Jun. 27, 2023

(54) MOLD WITH THERMALLY CONDUCTIVE FLANGES

(71) Applicant: TPI Composites, Inc., Warren, RI (US)

(72) Inventors: Jim Hannan, Fairhaven, MA (US); Andrew McDonald, Mooresville, NC (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/470,019

(22) Filed: Sep. 9, 2021

(65) Prior Publication Data

US 2021/0402652 A1   Dec. 30, 2021

Related U.S. Application Data

(63) Continuation of application No. 16/058,605, filed on Aug. 8, 2018, now Pat. No. 11,135,745.

(60) Provisional application No. 62/646,185, filed on Mar. 21, 2018.

(51) Int. Cl.
| | | |
|---|---|---|
| *B29C 33/02* | (2006.01) | |
| *F03D 1/06* | (2006.01) | |
| *B29C 70/48* | (2006.01) | |
| *B29L 31/08* | (2006.01) | |

(Continued)

(52) U.S. Cl.
CPC ............. *B29C 33/02* (2013.01); *B29C 70/48* (2013.01); *F03D 1/0675* (2013.01); *B29K 2105/089* (2013.01); *B29K 2309/08* (2013.01); *B29L 2031/085* (2013.01); *F05B 2230/20* (2013.01);

(Continued)

(58) Field of Classification Search
CPC ....... B29C 33/02; B29C 70/48; F03D 1/0675; B29L 2031/085; F05B 2230/20; F05B 2240/21; F05B 2280/6003
See application file for complete search history.

(56) References Cited

U.S. PATENT DOCUMENTS

| | | | |
|---|---|---|---|
| 3,387,333 A | 6/1968 | Irvine et al. | |
| 5,158,132 A * | 10/1992 | Guillemot | B29C 33/04 |
| | | | 219/448.11 |
| 8,357,325 B2 | 1/2013 | Koerwien | |

(Continued)

FOREIGN PATENT DOCUMENTS

| | | |
|---|---|---|
| CN | 102481704 A | 5/2012 |
| CN | 103362753 A | 10/2013 |

(Continued)

OTHER PUBLICATIONS

English translation of CN-206718516-U by EPO (OA Appendix). (Year: 2017).*

(Continued)

*Primary Examiner* — Leith S Shafi
*Assistant Examiner* — Inja Song
(74) *Attorney, Agent, or Firm* — Stephen J. Kenny; Vincenzo DiMonaco; Foley Hoag LLP

(57) ABSTRACT

A mold for forming a flange of a wind turbine blade comprising a first flange portion including a plurality of lamina and having a generally planar shape and a second perpendicular flange including a plurality of lamina. A plurality of copper wires are disposed within the lamina for conducting heat delivered from a base portion through the first and second flange portions. The mold is free of fluid conduits with the flange portions moveable relative to the base portion.

18 Claims, 5 Drawing Sheets

(51) Int. Cl.
 *B29K 309/08* (2006.01)
 *B29K 105/08* (2006.01)
(52) U.S. Cl.
 CPC ... *F05B 2240/21* (2013.01); *F05B 2280/6003* (2013.01)

(56) References Cited

U.S. PATENT DOCUMENTS

| | | |
|---|---|---|
| 9,463,583 B2 | 10/2016 | Saeger et al. |
| 11,135,745 B2 | 10/2021 | Hannan et al. |
| 2006/0034971 A1* | 2/2006 | Olsen ..................... F03D 1/065 425/451.5 |
| 2010/0140448 A1* | 6/2010 | Koerwien ............... B29C 33/02 427/133 |
| 2011/0198013 A1* | 8/2011 | Christiansen .......... B29C 33/02 156/359 |
| 2011/0254189 A1 | 10/2011 | Doyle et al. |
| 2013/0189114 A1 | 7/2013 | Jenzewski et al. |
| 2014/0127345 A1* | 5/2014 | Saeger ................... B29C 33/02 425/404 |
| 2015/0020975 A1* | 1/2015 | Matsen ................ B29C 70/345 156/359 |
| 2016/0158970 A1 | 6/2016 | Xie et al. |
| 2016/0193752 A1 | 7/2016 | Rajasingam et al. |
| 2017/0210035 A1 | 7/2017 | Fan et al. |

FOREIGN PATENT DOCUMENTS

| | | | |
|---|---|---|---|
| CN | 105189090 A | | 12/2015 |
| CN | 105473301 A | | 4/2016 |
| CN | 206718516 U | * | 12/2017 |
| WO | WO-2010/040576 A1 | | 4/2010 |
| WO | WO-2013/007452 A1 | | 1/2013 |
| WO | WO-2019/182634 A1 | | 9/2019 |

OTHER PUBLICATIONS

Extended European Search Report for EP Application No. 18910920 dated Nov. 25, 2021.
International Search Report and Written Opinion for International Application No. PCT/US2018/45801 dated Oct. 24, 2018.
Post et al., "Big Area Additive Manufacturing Application in Wind Turbine Molds," Solid Freeform Fabrication 2017: Proceedings of the 28th Annual International Solid Freeform Fabrication Symposium—An Additive Manufacturing Conference (17 pages) (2017).

* cited by examiner

MOLD WITH THERMALLY CONDUCTIVE FLANGES

CROSS-REFERENCE TO RELATED APPLICATIONS

This application is a Continuation of and claims the benefit of priority under 35 USC 120 of U.S. application Ser. No. 16/058,605 filed Aug. 8, 2018, which claims the benefit of priority under 35 USC 119 to U.S. Provisional application No. 62/646,185 filed Mar. 21, 2018, the entire contents of which are hereby incorporated by reference.

BACKGROUND OF THE DISCLOSED SUBJECT MATTER

Field of the Disclosed Subject Matter

The disclosed subject matter relates to a system for molding shaped composite materials. Particularly, the present disclosed subject matter is directed towards a mold and corresponding method of manufacturing composite materials including carbon and/or glass fiber, e.g., wind turbine blades.

Description of Related Art

A variety of methods and systems are known for forming and shaping wind turbine blades. Often it is desired to provide heat to aid in the shaping and contouring of such blades. Conventional wind turbine blade molds include fluid conduits or piping to deliver the heating/cooling medium—typically water.

Examples of conventional molds and techniques are provided in the following publications, each of which is hereby incorporated by reference in their entirety: U.S. Pat. Nos. 9,463,583, 8,108,982, 8,899,546, 4,105,184, 5,260,014, 5,358,211, 5,437,547, 6,264,877, 6,040,362, 8,202,458, 8,33,7192; and U.S. Patent Application Publication Numbers 20060027314, 20060249872, 20070102837, 20110221093, 20130113141, 20140333009, 20140345789, 20160158970, 20160185092 and US20160193752.

Such conventional methods and systems generally have been considered satisfactory for their intended purpose. Recently, however, there has been a need for a mold which can provide controlled heating of the composite component without the use of complex fluid heating/cooling systems.

The presently disclosed subject matter provides a new innovative solution for a mold for forming a flange of a composite material, e.g. wind turbine blade, in which the mold is formed with thermal conductors to transfer heat throughout the flange portions.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a mold for forming a flange of a wind turbine blade comprising a first flange portion, the first portion including a plurality of lamina; a second flange portion including a plurality of lamina, the second flange portion connected to the first flange portion; a thermal conductor disposed within at least a portion of the second flange portion; a base portion, the base portion having a heating element disposed therein; and wherein the thermal conductor is configured to transfer heat through the first flange portion and second flange portion.

In some embodiments, the second flange is integrally connected to, and disposed perpendicularly to the first flange portion.

In some embodiments, the first and second flange portions and base portion are free of fluid conduits.

In some embodiments, the thermal conductor is disposed within at least a portion of the first flange portion, and has a coefficient of thermal conductivity greater than the lamina material.

In some embodiments, the thermal conductor includes at least one metal foil, and/or a plurality of uniformly spaced copper wires.

In some embodiments, the thermal conductor extends along the entire length of the second flange portion.

In some embodiments, the heating element includes at least one copper wire.

In some embodiments, the heating element is disposed within a distance of approximately three inches from the surface of the base portion In some embodiments, the thermal conductor is disposed within a distance of approximately three inches from the surface of the second flange portion.

In some embodiments, the base portion is moveable relative to at least one of the first and second flange portions.

In some embodiments, the first or second flange portions are moveable relative to the base portion.

In some embodiments, a plurality of thermal conductors are interwoven between the lamina of the first and second flange portions.

In accordance with another aspect of the disclosure, a method of forming a portion of a wind turbine blade comprises: providing a mold having a first flange portion, the first portion including a plurality of lamina and having a generally planar shape; providing a second flange portion including a plurality of lamina, the second flange portion having a generally planar shape and connected to the first flange portion; providing a thermal conductor disposed within at least a portion of the second flange portion; providing a base portion, the base portion having a heating element disposed therein; activating the heating element in the base portion; transferring heat from the heating element through the first flange portion and second flange portion; and placing a composite material in contact with at least one of the base portion and second flange portions.

In some embodiments, the base portion is moved to at least partially contact the first flange portion.

In some embodiments, the thermal conductor is heated to provide a uniform temperature along the second flange portion.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1:
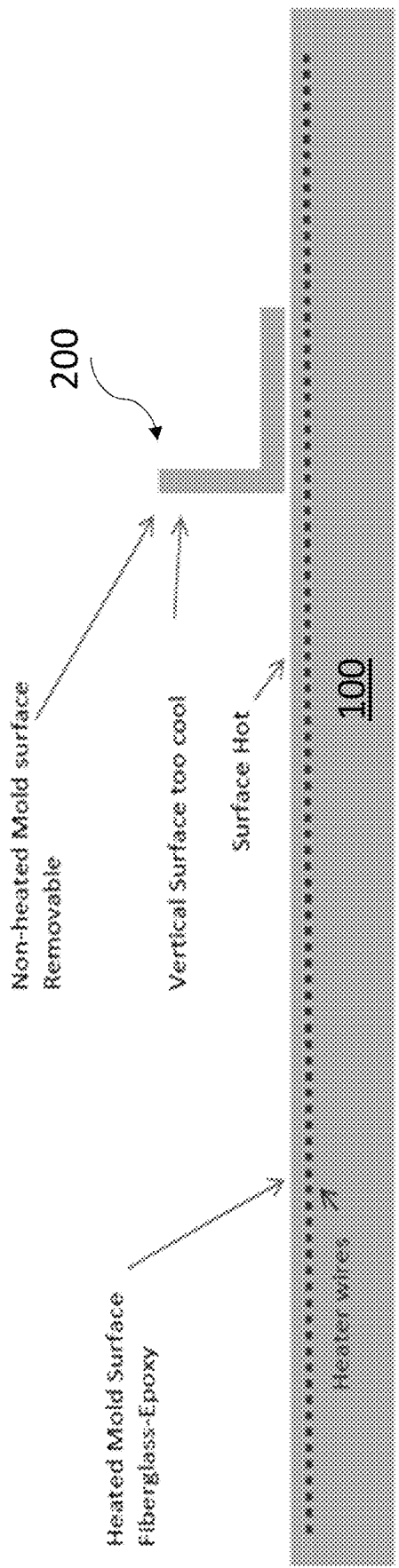
FIG. 1 is a schematic representation of convention mold for forming flanges of a wind turbine blade.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for molding shaped composite materials. The disclosed subject matter is particularly suited for manufacturing of composite materials including carbon and/or glass fiber, e.g., wind turbine blades.

Molds employed for manufacturing composite materials contain various contours to shape the composite material, ensure a desired geometry, and simultaneously process the composite materials, in particular for curing the matrix formers contained therein. For example, a fiber material is added to the mold in the area of fiber composite construction, and subsequently impregnated with resin, for example in a vacuum infusion process, and cured through thermal exposure. The manufacturing step involving impregnation can also be facilitated by using pre-impregnated material (prepreg).

In order to apply or introduce sufficient heat to the composite material to be fabricated or the fiber material impregnated with resin, the mold incorporates a heating device which can heat the composite material or matrix former container therein enough for curing purposes. However, large-surface molds can present a challenge in terms of selecting the geometry for the heating device in a way that can ensure both an adequately uniform distribution of heat in the mold, as well as a rapid response time for the desired portion(s) of the mold to reach the target temperature.

The molds employed in connection with wind turbine blade construction are sometimes provided with heating devices which are integrated into the mold as heating channels for guiding a heating fluid. Such heating devices are typically permanently laminated into the molds, which encompass glass fiber laminate or carbon fiber laminate, and cannot be removed repositioned or rearranged therein without destroying the composite. Worse, such conventional heating devices often generate undesired local heat maximums on the surface sections provided for shaping the composite material, which contribute to a non-uniform emission of heat to the composite material to be shaped and cured. The heat maximums can cause non-uniform structural features (e.g. local warping, ablation, etc.) to form in the composite article being formed within the mold.

Additionally, a non-uniform emission of heat to the composite material can cause certain areas of the composite material to cure prematurely, while other areas require additional dwell time to be sufficiently cured or stabilized. As a result, the quality and homogeneity of the composite material to be fabricated is inadequate. Heating a mold with fluid has additional drawbacks such the heating fluid (e.g. water) can cause corrosion in the pipes, destroying the mold. Also, the range of temperatures is limited as heating above 90° C. cannot be achieved and the fluid conduits often require pressurization and thus the risk of dangerous leakage or explosion can occur.

In accordance with present disclosure, the blade is formed by use of a mold having two portions a first one of which is designed to be positioned on the second portion. The first mold portion can be pivoted/rotated in a clam-shell fashion into engagement with the second portion, or alternatively can be lowered into engagement via handling means, e.g. crane with supporting straps.

Prior to joining the two mold portions, the two mold portions are in the open position in which the interior walls are exposed (i.e. face upwards) so that one or more layers of a flexible cloth having threads made up of a mixture of threads or fibers of plastics material and of reinforcing threads or fibers, preferably of fiberglass, can be put into place inside each mold portion. Such a cloth can be constituted by threads made up of a mixture of polypropylene fibers or threads and glass fibers or threads, and in the form of a sheet of woven threads and/or in multi-ply form.

For purpose of explanation and illustration, and not limitation, an exemplary embodiment of the system in accordance with the disclosed subject matter is shown in the accompanying drawings. FIG. 1 depicts a conventional mold design for forming a flange of a wind turbine blade having a base portion 100 and L-shaped flange 200. The base portion 100 is heated via wires, however the vertical surface of the L-shaped flange 200 remains relatively cool. Consequently, the conventional mold does not allow for direct and rapid delivery of heat to the vertical portion of the flange, and thus provide insufficient control over the flange forming process and duration.

Advantageously, the mold of the present disclosure provides for controlled heating/cooling throughout the entire flange and, in some embodiments, is free of fluid conduits thereby avoiding the complex peripheral equipment associated with liquid heated molds.

Figure 2:
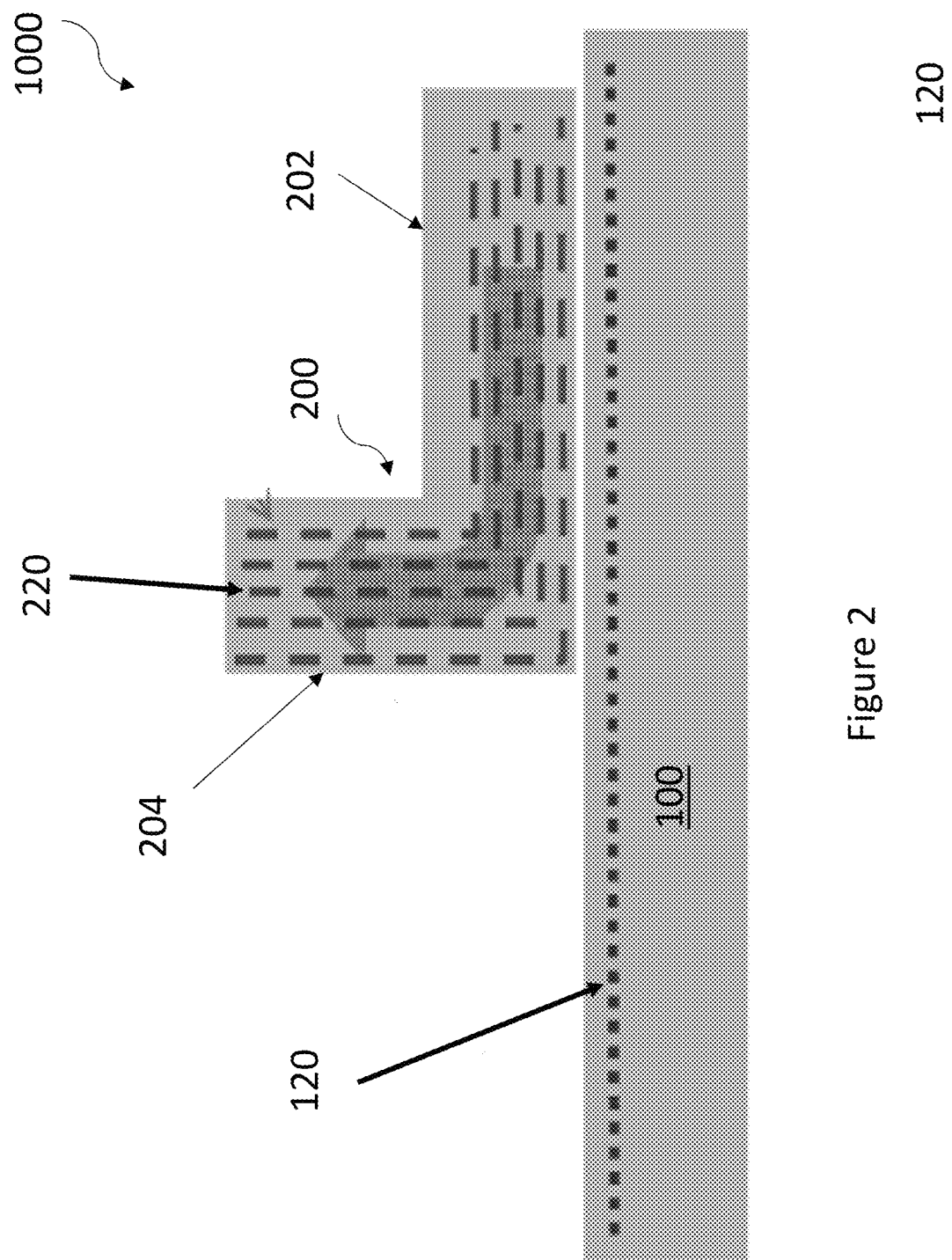
FIG. 2 is a schematic representation of the mold having a thermal conductor within the flange portions, in accordance with the disclosed subject matter.

FIG. 2 depicts an exemplary embodiment of the mold in accordance with the present disclosure and is designated generally by reference character 1000. Similar reference numerals (differentiated by the leading numeral) may be provided among the various views and Figures presented herein to denote functionally corresponding, but not necessarily identical structures.

As shown in FIG. 2, the system 1000 generally includes a mold for forming a flange of a wind turbine blade having a base portion 100 and L-shaped flange 200. The L-shaped flange includes a first flange portion 202 and a second flange portion 204. In the exemplary embodiment shown, the flange portions 202, 204 are integrally formed with the second portion 204 extending perpendicularly in the vertical direction from the first horizontal portion 202. For purpose of illustration and not limitation, an exemplary embodiment includes a flange having equally sized (i.e. aspect ratio=1) flange portions 202, 204 of approximately 4 inches in width. In other embodiments the flange 204 can be formed of a first size (e.g. 4 inches) while flange 202 has a larger size (e.g. 6 inches). It is to be understood that the current disclosure is not limited to any particular dimensions, and that the geometry of the flanges can be adjusted as desired to accommodate any desired blade configuration.

The base and flange portions of the mold can be formed from a plurality of laminations joined together. In some embodiments each layer has a uniform thickness and material composition, however non-uniform constructions are also contemplated to be within the scope of the disclosure. Also, adjacent lamina may be formed with consistent geometries, or alternatively, varying geometries depending on the proximity to the mold surface and the shape of the composite article to be formed. The number of lamina employed can be selected to achieve a desired amount of insulation of the heat transfer elements 120, 220 described in further detail below.

In some embodiments the laminations are composed of a fiber reinforced resin matrix composite material. All mold materials which are known in the art as being typical for the manufacture of polymeric molds may be employed. The resin matrix may be epoxy, polyester, vinylester, cyanate ester or a hybrid type. The fibers may be glass, carbon, basalt, aramid, or a hybrid type.

The base portion 100 is heated heating element 120, which can extend along the entire surface area of the base portion. In accordance with an aspect of the present disclosure, heat transfer elements 120, 220 can be employed to impart either a heating or cooling operation on the mold and flanges.

In some embodiments the heating element(s) 120 can be wires, e.g. steel, copper, etc. which have a coefficient of thermal conductivity which is greater than the mold lamina material employed. Additionally, if desired, the heating element can be configured as a fluid medium, e.g. water. The heating element 120 is positioned proximate the surface of the base portion which engages the composite article to provide rapid and efficient heat transfer. In an exemplary embodiment, the heating element 120 is disposed within a distance of approximately three inches from the surface of the base portion which engages the composite article. Though it should be understood that the location of the heating element proximate the surface can be adjusted as desired to achieve the target heating/cooling performance.

The flange portions 202, 204 can be formed with a thermal conductor 220 disposed between the lamina of the flanges. The thermal conductors 220 allow for controlled and efficient delivery of heat from the horizontal first portion 202 upward, and away from the heat source, i.e. heating element 120, to the vertical second portion 204, as indicated by the arrow superimposed on the flange member as shown in FIG. 2. In some embodiments the thermal conductor 220 is formed from a metal (e.g. copper, steel, etc.) having a coefficient of thermal conductivity which is greater than the surrounding mold lamina material employed.

Additionally, the thermal conductor 220 can be shaped as a foil having a substantially flat configuration. Such a construction can be advantageous in that it allows for a plurality of thermal conductors 220 to be positioned adjacent each other in an abutting manner to eliminate any gaps therebetween. Also, forming the thermal conductor 220 as a planar foil allows for easy application of overlying lamina when forming the mold 1000. However, in some embodiments the thermal conductor can be formed as a round wire having a diameter, or gauge, sufficient to provide the desired amount of thermal conductivity. The thermal conductors 220 can be arranged in a uniformly spaced manner across the surface of the flange member. In some embodiments, the thermal conductor can be formed as a plurality of wires, or layers of foil, which are embedded in an interwoven fashion with the mold lamina.

Additionally or alternatively, the thermal conductor 220 can be configured as a woven mesh of equally-spaced conductive fibers, e.g. veil, positioned approximately 9-11 millimeters below the surface. In some embodiments, the thermal conductor 220 can be a substantially contiguous sheet having perforations therein. In yet other embodiments, the thermal conductor 220 can be a bundle of fine and flexible filaments arranged in a uniform or random orientation.

Figure 3:
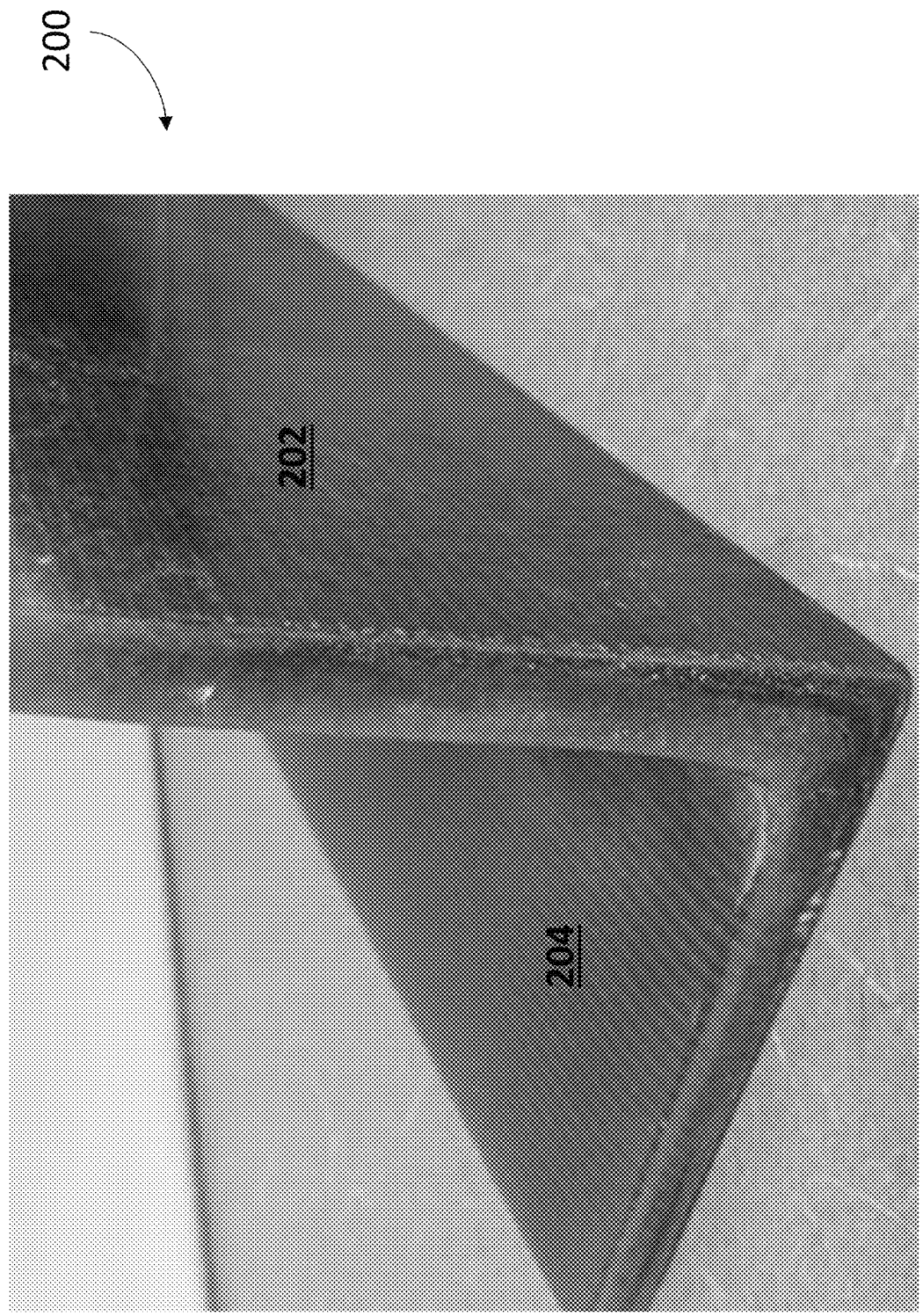
FIG. 3 is a view of the mold after an infusion process, with the thermal conductor incorporated under the mold exterior surface, in accordance with the disclosed subject matter.
Figure 4:
FIG. 4 is a view of the mold with the thermal conductors added to the layup of the blade during flange lamination, in accordance with the disclosed subject matter.

In the exemplary embodiment shown in FIGS. 2-4, the thermal conductor 220 extends along the entire length of the first 202 and second 204 flange portions. This allows for the controlled and efficient transfer of heat, at all points along the second flange portion 204, directly to the composite article being formed. In some embodiments, the thermal conductors 220 can be positioned in a more dense, e.g. closer, configuration in one flange portion relative to the other flange portion. For example, thermal conductors 220 in the second flange portion 204 can be more densely packed than the thermal conductors in the first flange portion 202. Such a configuration can compensate for the inherent dissipation of heat as the current travels up the flange portion 204, and thus provides for a more consistent temperature within that flange portion.

Thermal conductor 220 provides controlled rates of heat transfer which can limit internal stresses of a resultant product and limiting shrink and warpage of the product. Such control consequently enhances an overall quality of the resulting product. Additionally, the cycle time may be significantly reduced for improving the output volume of components fabricated by the particulate tool 1000.

In some embodiments, the heating element 120 of the base portion is the only element directly heated (i.e. the thermal conductors 220 in the flange 200 do not have a current directly applied therein). Additionally, or alternatively, the thermal conductors 220 in the flange 200 can have a current directly applied to expedite heat transfer and flange formation. The thermal conductors 220 and heating elements 120 can have a common power source or distinct power sources, as desired. An advantage of utilizing a plurality of thermal conductors 220 with a distinct power source is that even if there is a failure in the heating element 120 in the base portion during the manufacturing process, the flange portion 200 retains the ability to reach the desired temperature via direct application of heat through thermal conductors 220. Similarly, forming the thermal conductors 220 as a plurality of interwoven members is beneficial in that the mold remains able to reach the desired temperature even if a particular thermal conductor fails or is damaged.

In operation, the mold can be opened and closed by imparting relative movement between the base portion 100 and flange portion 200. In other words, the base portion 100 can be fixed and the flange portion 200 moveable, or the base portion 100 can be moveable while the flange portion 200 remains fixed. Additionally, or alternatively, both the base portion 100 and flange portion 200 can be moved simultaneously.

Once the composite material to be formed into the finished article is deposited within the mold, the heating element 120 is activated to a desired temperature. Additionally, in those embodiments where the thermal conductor 220 can also be directly heated via an applied current, the thermal conductors will be activated to reach a desired temperature. As the flange portion 200 is brought into contact (or at least proximity) with the base portion 100, heat is transferred from the heating element 120 to the thermal conductors 220 in the first flange portion 202. The heat acquired in the first flange portion 202 is further transferred from the first flange portion 202 to the second flange portion 204. Thus, allowing for second flange portion 204 to more quickly reach the desired temperature, and maintain that temperature for the duration of the flange formation cycle.

In some embodiments, the flange 202, or at least portions thereof, is brought into direct contact with base portion 100. Such configurations can enhance heat transfer and to achieve the target temperature more rapidly, thereby reducing cycle time.

In accordance with another aspect of the disclosure, the heat transfer system disclosed herein can be operated to provide localized heating/cooling zones within the flange. For example, select heating elements 120, and corresponding thermal conductors 220, can be set to a higher temperature than neighboring elements/conductors along the flange length. In some embodiments, the localized heating/cooling zones can be operated independently of each other—with a first zone providing a heating application while a neighboring zone simultaneously provides a cooling application. Further, the thermal conductors 220 within the flange can also serve as thermometers to provide real-time feedback of the temperature present at each location of the flange. This allows for continuous monitoring of the thermal map of the blade to avoid or achieve any particular heat gradient desired. Moreover, the thermal conductors 220 can trigger an alarm if any preselected temperature limit is exceeded.

Figure 5:
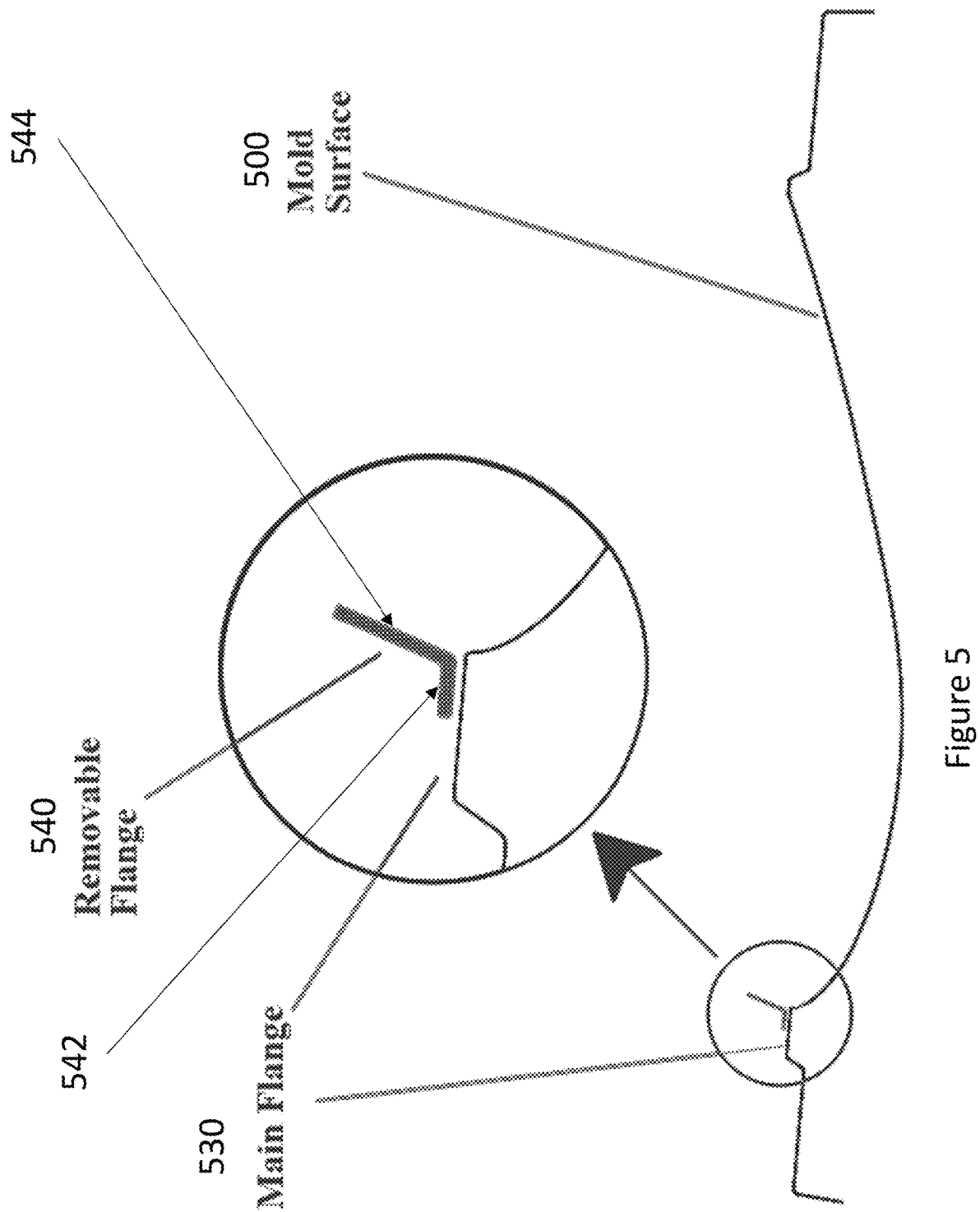
FIG. 5 is a schematic cross-sectional view of mold with a removable flange, in accordance with the disclosed subject matter.

As shown in FIG. 5, a lower mold half (e.g. pressure side of blade) is provided having mold surface 500 which forms the skin of the blade (a complimentary second mold half for forming the suction side of the blade is also provided which is closed upon the lower mold, with resin thereafter drawn throughout the fiber layup segments). Each mold half includes a main flange (e.g. 530) which is a permanent part of the mold. As shown in greater detail in the zoom-in callout of FIG. 5, the lower mold has a substantially planar flange 530 which is configured to operate in tandem with removable flange 540. The removable flange 540 containing the thermal conductors, as described above. In some embodiments, as shown the main flange 530 can extend a distance greater than the generally laterally extending portion 542 of removable flange 540, as shown in FIG. 5. Additionally, the upwardly extending portion 544 can be formed at an angle other than 90°, e.g. approximately 105° relative to lateral portion 542, as shown. In such embodiments, the thermal flange portion 544 facilitates the formation of a bonding flange of the turbine blade, which has a complimentary flange formed on the other blade half, with these two formed flanges being brought into engagement upon closure of the two mold halves to provide final bonding and blade assembly.

In operation, the removable flange 540 is brought into engagement with main flange 530 while the composite structure is formed within the mold with the desired fiber (e.g. glass, carbon, etc.) and resin. Additionally, the thermal conductors are activated to achieve the desired temperature in the removable flange 542, 544, which facilitates the formation of the bonding surface flange of the final product. Once formed and the desired temperature of the formed flange is obtained, the removable flange 540 is removed, leaving the formed flange unobstructed and configured for engagement with the complimentary flange formed in the other mold half.

In accordance with the present disclosure, a plurality of removable flanges can be incorporated on both the upper (blade suction side) mold and lower (blade pressure side) mold to form complimentary flanges which are bonded together for form the final blade assembly.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of forming a portion of a wind turbine blade within a blade mold comprising:
   providing a removable mold having a first laterally extending flange portion, the first laterally extending portion including a plurality of laminae and having a generally planar shape;
   providing a second vertically extending flange portion including a plurality of laminae, the second vertically extending flange portion having a generally planar shape and connected to the first laterally extending flange portion;

wherein a thermal conductor is disposed within at least a portion of the second vertically extending flange portion;

positioning the removable mold above a base portion of the blade mold, the base portion of the blade mold having a heating element disposed therein;

activating the heating element in the base portion of the blade mold;

transferring heat from the heating element through the first laterally extending flange portion and the second vertically extending flange portion, wherein the second vertically extending flange portion is disposed at a leading edge of the base portion of the blade mold; and placing a composite material in contact with at least one of the base portion of the blade mold and the second vertically extending flange portion; and removing the removable mold from the blade mold.

2. The method of claim 1, further comprising moving the base portion of the blade mold to at least partially contact the first laterally extending flange portion.

3. The method of claim 1, further comprising heating the thermal conductor to provide a uniform temperature along the second vertically extending flange portion.

4. The method of claim 1, wherein the thermal conductor extends from the first laterally extending flange portion to the second vertically extending flange portion.

5. The method of claim 1, wherein the second vertically extending flange portion extends perpendicularly from the first laterally extending flange portion.

6. The method of claim 1, wherein the second vertically extending flange portion is disposed perpendicularly to the first laterally extending flange portion.

7. The method of claim 1, wherein the first laterally extending flange portion and the second vertically extending flange portion are integrally connected.

8. The method of claim 1, wherein the thermal conductor is disposed within at least a portion of the first laterally extending flange portion.

9. The method of claim 1, wherein the thermal conductor includes at least one copper wire.

10. The method of claim 1, wherein the thermal conductor extends along the entire length of the second vertically extending flange portion.

11. The method of claim 1, wherein the base portion of the blade mold is moveable relative to at least one of the first laterally extending flange portion and the second vertically extending flange portion.

12. The method of claim 1, wherein the first laterally extending flange portion or the second vertically extending flange portion is moveable relative to the base portion.

13. A method of forming a portion of a wind turbine blade within a blade mold, the method comprising:

providing a removable mold having a first laterally extending flange portion, the first laterally extending portion including a plurality of laminae and having a generally planar shape;

providing a second vertically extending flange portion including a plurality of laminae, the second vertically extending flange portion having a generally planar shape and connected to the first laterally extending flange portion;

wherein a thermal conductor is disposed within at least a portion of the second vertically extending flange portion;

positioning the removable mold above a base portion of the blade mold;

applying a current to the thermal conductor;

transferring heat through the first laterally extending flange portion and the second vertically extending flange portion, wherein the second vertically extending flange portion is disposed at a leading edge of the base portion of the blade mold; and placing a composite material in contact with at least one of the first horizontally extending flange portion and the second vertically extending flange portion; and removing the removable mold from the blade mold.

14. The method of claim 13, wherein the first horizontally extending flange portion includes zones therein that are heated to different temperatures.

15. The method of claim 13, wherein the first laterally extending flange portion or the second vertically extending flange portion are moveable relative to the base portion.

16. The method of claim 13, further comprising moving the base portion of the blade mold to at least partially contact the first laterally extending flange portion.

17. The method of claim 13, wherein the thermal conductor includes at least one copper wire.

18. The method of claim 13, wherein the thermal conductor extends along the entire length of the second vertically extending flange portion.

* * * * *